July 18, 1950 J. W. ACOSTA 2,515,683

CIRCUIT COUPLING DEVICE FOR HIGH-FREQUENCY THERAPEUTIC APPARATUS

Filed Dec. 20, 1946 2 Sheets-Sheet 1

Inventor
JOSE' W. ACOSTA,

By McMorrow, Berman & Davidson
Attorneys

Inventor
JOSE' W. ACOSTA,
By McMorrow, Berman and Davidson
Attorneys

Patented July 18, 1950

2,515,683

UNITED STATES PATENT OFFICE 2,515,683

CIRCUIT COUPLING DEVICE FOR HIGH-FREQUENCY THERAPEUTIC APPARATUS

José W. Acosta, Chicago, Ill.

Application December 20, 1946, Serial No. 717,466

4 Claims. (Cl. 128—422)

This invention relates to circuit couplers, and more particularly to a coupling device having both capacitive and inductive features.

A main object of the invention is to provide a novel and improved method and means for coupling low frequency circuits, wherein a single unitary element is employed both as an inductance and a capacitance to provide a desired by-pass or filtering action with respect to voltage components which are to be eliminated or substantially prevented from reaching the load circuit.

A further object of the invention is to provide a novel and improved coupler for low frequency circuits which may be employed either as a high pass filter, as a low pass filter, or as a sound reproducer.

Further objects and advantages of the invention will become apparent from the following description and claims, and from the accompanying drawings, wherein:

Figure 11:
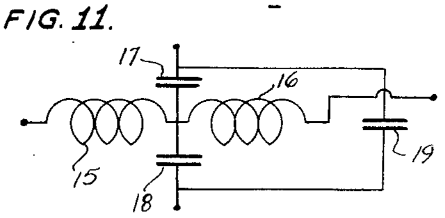
Figure 11 is an equivalent circuit diagram of a coupling device according to the present invention.

Referring to the drawings, 11 generally designates a circuit coupling unit according to this invention. Coupling unit 11 comprises a hollow inner metal core 12 which may be either of magnetic or non-magnetic material and is preferably relatively thin walled. Wound on core 12 is a coil 13 which is of substantially the same length as that of the core and forms the inductive winding of the device. Encircling coil 13 is a relatively short, thin metal sheath 14 which may be either of magnetic or non-magnetic material, and is in a capacitive relation both to inner core 12 and to winding 13. Inner core 12 is, of course, in a capacitive as well as inductive relation to winding 13. The equivalent electrical circuit of the unit is shown in Figure 11, wherein coil 13 is represented as split into two identical segments 15 and 16. 17 represents the capacitance between the coil and outer sheath 14; 18 represents the capacitance between the coil and core 12, and 19 represents the capacitance between the core 12 and the outer sheath 14.

Figure 3:
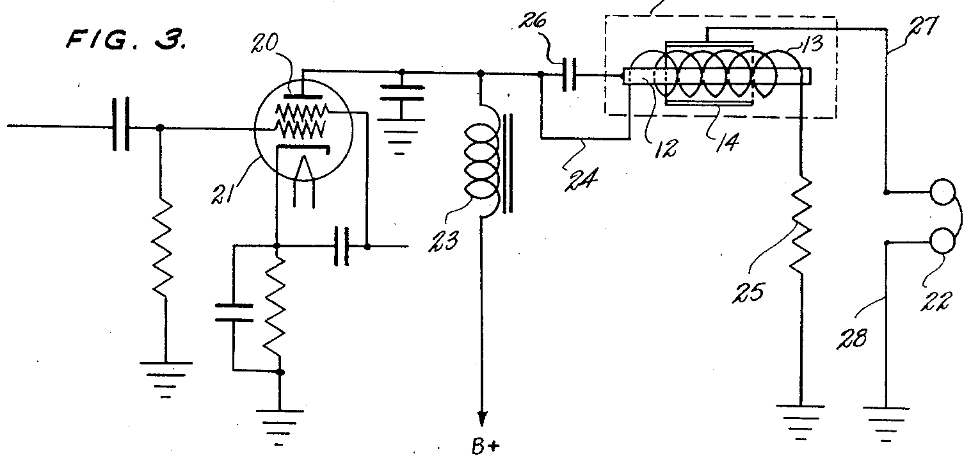
Figure 3 is a schematic circuit diagram illustrating the employment of the coupling device of Figure 1 in lieu of an output transformer for coupling a sound reproducer to the output tube of an amplifier.

Figure 3 illustrates the application of the coupling unit as an output device for coupling the plate 20 of a power tube 21 of an amplifier to a sound reproducer shown at 22. Plate voltage is applied to plate 20 through a load impedance 23. The plate 20 is connected by a conductor 24 to one terminal of coil 13 and the other terminal of said coil is connected to ground through a current-limiting resistor 25. Plate 20 is connected to core 12 through a blocking condenser 26. Outer sheath 14 is connected to one terminal of the reproducer voice coil by a conductor 27 and the other terminal of the voice coil is connected to ground by a conductor 28. It will be seen that no direct current can flow through the reproducer voice coil, but that audio currents can reach the reproducer by virtue of the capacitive coupling between outer sheath 14 and coil 13 (which is in effect in parallel with load impedance 23) and the capacity between inner core 12 and outer sheath 14, said capacity being in series with blocking condenser 26 and the plate circuit of output tube 21. As employed in Figure 3, coupling unit 11 eliminates the need for an output transformer and prevents direct current from the plate circuit of power tube 21 from flowing through the reproducer voice coil.

Figure 4:
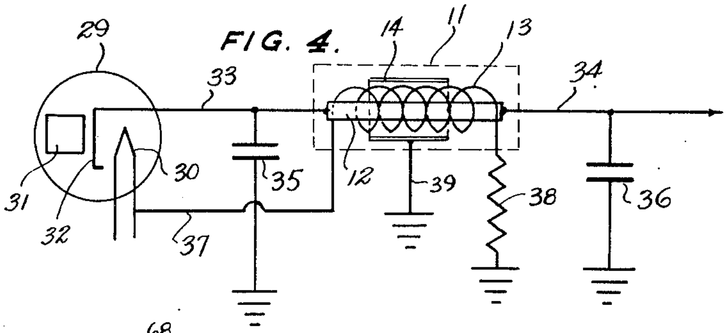
Figure 4 is a schematic diagram illustrating the employment of the coupling device of Figure 1 as a filter element in a simple half-wave rectifier.

Figure 4 illustrates the application of the coupling unit as a filter device in a simple half-wave rectifier. The rectifier tube is shown at 29 and has a filament 30, an anode 31 and a cathode 32. The cathode is connected by a conductor 33 to one end of core 12 and the other end of the core is connected to the output voltage wire 34. Conventional filter condensers 35 and 36 are connected between the respective conductors 33 and 34 and ground. One terminal of coil 13 is connected by a conductor 37 to filament 30 and the other terminal is connected to ground through a resistor 38. Outer sheath 14 is connected to ground by a conductor 39. The capacitance between core 12 and outer sheath 14 provides a filter action supplemental to that provided by condensers 35 and 36 to smooth out A. C. ripple and a choke action is provided by the mutual inductance between core 12 and coil 13. Since the resistance of core 12 is practically zero, the voltage drop between conductors 33 and 34 is negligible. This is a very desirable feature in receivers of the "A. C.-D. C." type, wherein step-up transformers are not employed at the input side of the rectifier.

Figure 5:
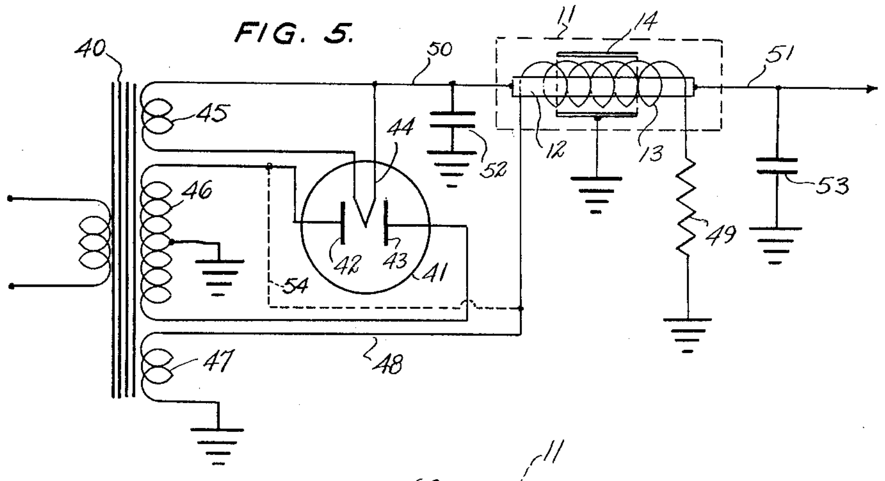
Figure 5 is a schematic circuit diagram illustrating the employment of the coupling device of Figure 1 as a filter element in a full wave rectifier.

Figure 5 illustrates the application of the coupling unit as a filter device in a full wave rectifier of the type employed in larger A. C. receivers. The rectifier has a step-up transformer 40 and employs a full wave rectifier tube 41 having anode plates 42 and 43 and a cathode filament 44 which is connected across a low voltage secondary winding 45 of transformer 40. The terminals of the high voltage secondary winding 46 are connected to the respective anode plates 42, 43 in a conventional manner. The transformer has an additional low voltage secondary winding 47. One terminal of winding 47 is grounded. The other terminal is connected by a conductor 48 to one end of coil 13 of coupling unit 11. The other end of coil 13 is connected to ground through a current limiting resistor 49. Cathode 44 is connected by a conductor 50 to one end of core 12. The other end of said core is connected to the output voltage wire 51. Conventional filter condensers 52 and 53 are connected between the respective conductors 50 and 51 and ground. Sheath 14 is connected to ground to supplement the filtering action of condensers 52 and 53. A further filtering action to smooth out A. C. ripple in the output voltage is obtained by the mutual inductance choke action between core 12 and coil 13.

Instead of employing the auxiliary winding 47, one end of the high voltage secondary 46 may be connected to coil 13, as shown in dotted view at 54.

As in the embodiment of Figure 4, the voltage drop through the coupling unit core 12 in Figure 5 is negligible.

Figure 6:
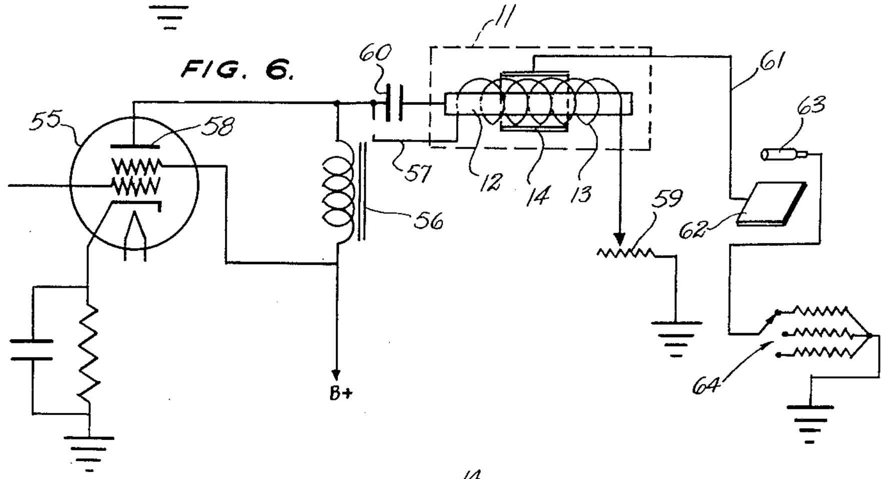
Figure 6 is a schematic circuit diagram illustrating the employment of the coupling device of Figure 1 for coupling the load circuit of an audio frequency vibrator or massage apparatus to the output circuit of an audio oscillator.

Figure 6 illustrates the application of the coupling unit as an output coupler for an audio frequency vibrator or massage apparatus. 55 designates the output tube of an audio oscillator, and 56 is a conventional load impedance connected in the plate circuit of output tube 55. One terminal of coil 13 is connected by a conductor 57 to the plate 58 of tube 55 and the other terminal of said coil is connected through a variable resistor 59 to ground for varying the capacitance of coil 13 with respect to core 12 and sheath 14. The core 12 is coupled to plate 58 through a blocking condenser 60. Connected to sheath 14 by a conductor 61 is one of a pair of massaging electrodes 62. The other massaging electrode 63 is connected to ground through a variable resistance unit 64 having three different resistances with which electrode 63 is capable of being selectively connected. The arrangement is effective to vary the therapeutic or electrical effect produced between the electrodes 62 and 63 and is similar to that of Figure 3, except that the load circuit is a portion of the patient's body rather than the voice coil of a sound reproducing device. It will be noted that no direct current can flow in the output circuit between massage electrodes 62 and 63, but that solely audio frequency currents are available at said electrodes to produce the desired therapeutic effects. The circuit of Figure 6 may be employed either as the output circuit of an audio oscillator, whereby a constant audio frequency will be available from both electrodes 62 and 63, or the circuit may be employed as the output stage of a conventional radio receiver, whereby audio frequencies varying in accordance with demodulated speech and music radio signals will be available at electrodes 62 and 63, providing a different type of therapeutic treatment.

If so desired, the end of core 12 may be connected to conductor 61, as shown in dotted view at 65. This, in effect, short-circuits the capacitance between core 12 and sheath 14 and reduces the impedance of the output circuit, thus providing an increased audio current flow from both of the electrodes 62 and 63 through the patient's body. Core 12 is then inductively coupled to coil 13 as well as capacitively coupled to plate 58 through condenser 60.

Figure 7:
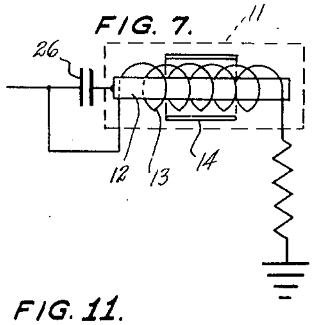
Figures 7, 8 and 9 illustrate variations of the types of circuit connections which may be utilized with coupling devices such as illustrated in Figure 1.
Figure 8:
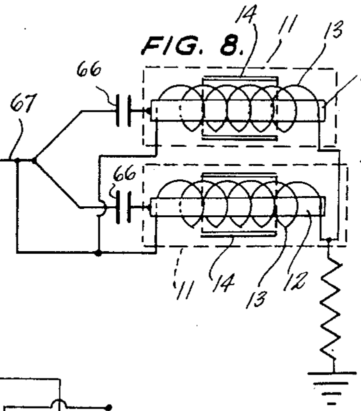
Figure 9:
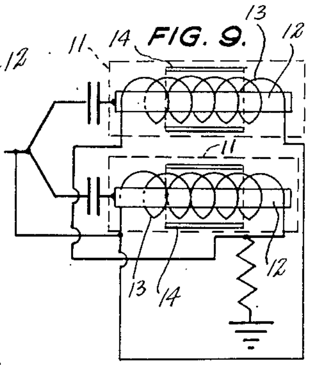

Figure 7 shows the single-unit connection of the coupling device, as employed in Figure 3. Figures 8 and 9 show alternative arrangements employing two coupling units in place of the single unit arrangement of Figure 7. In Figure 8, the coils 13 of the coupling units are connected in parallel and each of the cores 12 is connected through a coupling condenser 66 to the plate wire 67 of an output tube, not shown.

In Figure 9, the coils 13 are connected so that the voltages available at the respective cores 12 (and the respective sheaths 14) are opposed in phase and hence are additive. Various other useful wiring arrangements of multiple coupling units will suggest themselves to those skilled in the art.

Figure 1:
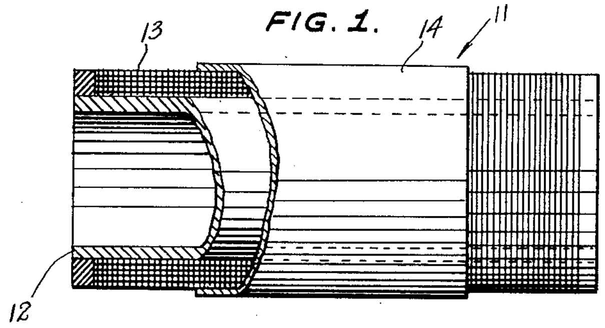
Figure 1 is a side elevational view, partly in cross-section, of a circuit coupling device constructed in accordance with the present invention.
Figure 2:
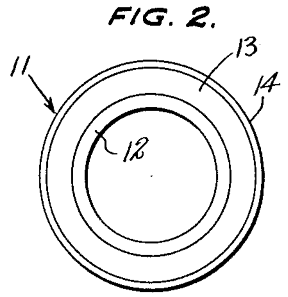
Figure 2 is an end view of the coupling device of Figure 1.
Figure 10:
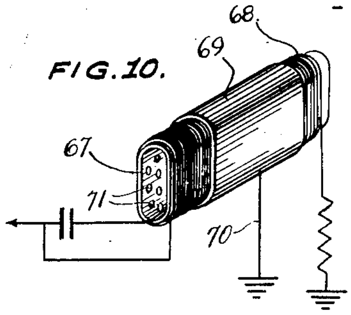
Figure 10 is a perspective view of a modified coupling device according to the present invention adapted to be employed as a sound reproducer.

Figure 10 illustrates a modification of the coupling unit of the present invention which may be employed as a sound reproducer. In the arrangement of Figure 10, the unit is generally flattened and comprises an inner tubular core 67 having a coil 68 wound thereon. Encircling coil 68 is a vibratory sheath 69 of thin magnetic material. The circuit arrangement employed for the unit of Figure 10 is similar to that of Figure 3, except that vibratory sheath 69 acts as the sound reproducer. Sheath 69 vibrates in accordance with the audio currents induced therein from coil 68, said coil operating in a manner analogous to the voice coil of a conventional sound reproducer and sheath 69 functioning as a diaphragm. The inner core 67 is capacitively coupled to the coil 68 by its proximity thereto and is also capacitively coupled to the outer sheath 69, as explained in connection with Figures 1 and 2. Outer sheath 69 is connected to ground by a conductor 70. By properly selecting the components of the unit, the impedance of the output unit may be made to match the reflected impedance of the driving circuit, whereby signal transmission of maximum efficiency may be achieved.

Inner core 67 is preferably perforated, as shown at 71, to permit free movement of air through coil 68 and the walls of said inner core as outer sheath 69 vibrates.

While certain certain specific embodiments of a coupling device for low frequency circuits have been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. In an audio frequency therapeutic device of the type employing an audio output stage and a pair of massaging electrodes, and utilizing the human body as a direct connection between the electrodes to form part of the audio frequency circuit, the features which include a coupling device coupling one of the electrodes to the plate of the output of the audio stage, the coupling device including a metal core, means capactively coupling the metal core to the plate of the output tube of said audio stage, a coil wound upon the core, means connecting the coil in the plate-cathode circuit of the output tube, a metal sheath closely encircling the intermediate portion of said coil, a conductor directly connecting said one of the electrodes to said metal sheath, and conductor means connecting the other of said electrodes to the cathode of the output tube.

2. In an audio frequency therapeutic device of the type employing an audio output stage and a pair of massaging electrodes, and utilizing the human body as a direct connection between the electrodes to form part of the audio frequency circuit, the features which include a coupling device capactively coupling one of the electrodes to the plate of the output tube of the audio stage, the coupling device including a metal core, means capactively coupling the metal core to the plate of the output tube of said audio stage, a coil of substantially the same length as that of said metal core wound upon the latter, means connecting the coil in the plate-cathode circuit of the output tube, a metal sheath closely encircling the intermediate portion of said coil, a conductor connecting one of the electrodes directly to said metal sheath, a group of resistances of different values connected to the cathode of said tube, and a conductor connected to the other of said electrodes adapted to be selectively connected to said resistances.

3. In an audio frequency therapeutic apparatus of the character described, an output tube, a first therapy electrode, a second therapy electrode, means connecting the first electrode to the cathode of the output tube, an inductor connected in the plate-cathode circuit of the output tube, and means capacitively coupling the second therapy electrode to said inductor.

4. In an audio frequency therapy apparatus of the character described, an output tube, a first therapy electrode, a second therapy electrode, means connecting the first electrode to the cathode of the output tube, an inductor connected in the plate-cathode circuit of the output tube, a metal sheath encircling said inductor and in capacitive relation thereto, means connecting the second therapy electrode to said sheath, a metal core within said inductor and in capacitive relation to said inductor and said sheath, and means capacitively coupling said core to the plate of the output tube.

JOSÉ W. ACOSTA.

REFERENCES CITED

The following references are of record in the file of this patent:

UNITED STATES PATENTS

| Number | Name | Date |
|---|---|---|
| 363,304 | Stanley | May 17, 1887 |
| 712,715 | Petich | Nov. 4, 1902 |
| 775,869 | Strong | Nov. 22, 1904 |
| 1,643,169 | Wyman | Sept. 20, 1927 |
| 1,795,948 | High | Mar. 10, 1931 |
| 1,807,331 | Wright | May 26, 1931 |
| 1,844,626 | Anderson | Feb. 9, 1932 |
| 1,939,808 | Freeland | Dec. 19, 1933 |
| 1,945,544 | Conklin | Feb. 6, 1934 |
| 2,198,073 | Bayless et al. | Apr. 23, 1940 |
| 2,225,967 | Berman | Dec. 24, 1940 |
| 2,299,605 | Willers | Oct. 20, 1942 |
| 2,321,659 | Connerty et al. | June 15, 1943 |
| 2,326,053 | Morris | Aug. 3, 1943 |
| 2,361,187 | Foster | Oct. 24, 1944 |
| 2,417,296 | Dikstaal | Mar. 11, 1947 |
| 2,457,212 | Di Toro | Dec. 28, 1948 |